United States Patent [19]

McGovern

[11] Patent Number: 5,578,663
[45] Date of Patent: Nov. 26, 1996

[54] PAVEMENT REJUVENATOR AND DRESSING CONDITIONER WITH ELASTOMER

[75] Inventor: Edward W. McGovern, Pittsburgh, Pa.

[73] Assignee: K.A.E. Paving Consultants, Inc., Pittsburgh, Pa.

[21] Appl. No.: 429,581

[22] Filed: Apr. 27, 1995

[51] Int. Cl.⁶ .................................................... C08L 95/00
[52] U.S. Cl. ........................... 524/66; 524/59; 524/60; 524/68; 524/71
[58] Field of Search ........................... 524/59, 60, 61, 524/66, 485, 486, 324, 325, 384, 68, 71

[56] References Cited

U.S. PATENT DOCUMENTS

| | | | |
|---|---|---|---|
| 3,221,615 | 12/1965 | McGovern | 106/285 |
| 3,261,269 | 7/1966 | McGovern | 427/138 |
| 3,835,117 | 9/1974 | Walaschek | 524/66 |
| 3,897,380 | 7/1975 | Walaschek | 524/60 |
| 4,139,397 | 2/1979 | Yan | 524/66 |
| 4,661,378 | 4/1987 | McGovern | 427/140 |
| 5,180,428 | 1/1993 | Koleas | 524/60 |

FOREIGN PATENT DOCUMENTS

| | | | |
|---|---|---|---|
| 0210541 | 1/1956 | Australia | 524/66 |
| 0211004 | 10/1956 | Australia | 524/66 |
| 0422315 | 4/1991 | European Pat. Off. | 524/66 |
| 0155524 | 12/1975 | Japan | 524/60 |
| 0019855 | 5/1977 | Japan | 524/66 |
| 0245638 | 6/1969 | U.S.S.R. | 524/66 |

*Primary Examiner*—Peter A. Szekely
*Attorney, Agent, or Firm*—Webb Ziesenheim Bruening Logsdon Orkin & Hanson, P.C.

[57] ABSTRACT

A pavement rejuvenating and/or conditioning composition in which particular coal tar derivatives and other optional ingredients are supplemented with an elastomeric constituent. A rejuvenating or conditioning composition containing an elastomer will reliably hold in place a top layer of fine aggregate, whereas a rejuvenating or conditioning composition without elastomer does not, and also allows for early restoration of traffic, prompt resistance to rain, and good repair and wear resistance of and in the pavement to be maintained. The elastomer is preferably acrylonitrile-butadiene polymer although other polymers can also be substituted including natural and nitrile-rubbers, polyorganosiloxane and, less preferably, styrene-butadiene, neoprene- and polybutadiene polymers.

10 Claims, No Drawings

PAVEMENT REJUVENATOR AND DRESSING CONDITIONER WITH ELASTOMER

FIELD OF THE INVENTION

The invention relates to improvements in pavement rejuvenator and dressing conditioner compositions through the use of elastomers.

BACKGROUND OF THE INVENTION

The creation and maintenance of paved surfaces has a long history, but very little in that long history has prepared the industry for its current demands and constraints. Environmental protection pressures have eliminated many otherwise tried-and-true materials and solvents for use as pavement constituents. At the same time, roads and other paved surfaces are experiencing the stresses of greater traffic and larger, heavier vehicles (not to mention additional modern stresses such as acid rain and the extra wear inevitable from aggressive snow and ice removal) and the paving industry must therefore meet commensurately higher paving quality specifications with new, environmentally acceptable materials—and still do so in a commercially competitive way.

One way to preserve the integrity of paved surfaces is to maintain them, so as to avoid the necessity of rebuilding or resurfacing them. A bituminous pavement rejuvenator for such a purpose is disclosed in U.S. Pat. No. 3,221,615, incorporated herein by reference, which is a coal tar derivative composition containing specific ingredients and having particular specifications. Other pavement treating compositions are disclosed in U.S. Pat. Nos. 3,261,269 and No. 4,661,378, also incorporated herein by reference, which disclose pavement dressing conditioners which contain the above-described bituminous pavement rejuvenator together with additional ingredients and/or solvents. These pavement treating compositions are generally spread or sprayed onto existing pavement surfaces (not only bituminous surfaces but concrete and other surfaces as well) to preserve and to restore the integrity of the pavement.

Even these pavement preserving and restoring compositions, however, do not meet all the needs of the current pavement maintenance industry. For example, pavement restorers often wish to restore bituminous pavements with a composition which will also retain a top layer of fine aggregate, for additional strength and finish in the restoration. Fine aggregate can be considered to be any natural or manufactured sand with 100% passing a No. 4 sieve and not more than 10% passing a No. 200 sieve. However, existing pavement treating compositions are not good at retaining fine aggregate. Also, existing pavement treating compositions are not noted for their ability reliably to fill cracks in bituminous pavement or to yield long wear in such repairs—nor are the compositions well adapted for pavement treating followed by immediate resistance to the stresses of weather or restored traffic.

Therefore, a need remains for a composition which can be used to maintain—or to repair—pavement, which has all the advantages of prior art conditioners and rejuvenators, but which also holds fine aggregate, provides long lasting pavement crack repair, gives good resistance to weather even soon after application, and allows for prompt restoration of the pavement to its normal use.

SUMMARY OF THE INVENTION

In order to meet this need, the present invention is a pavement rejuvenating and/or conditioning composition in which particular coal tar derivatives and other optional ingredients are supplemented with an elastomeric constituent. A rejuvenating or conditioning composition containing an elastomer will reliably hold in place a top layer of fine aggregate, whereas a rejuvenating or conditioning composition without elastomer does not. The elastomer is preferably acrylonitrile-butadiene polymer although other polymers can also be substituted including natural and nitrile-rubbers, polyorganosiloxane and, less preferably, styrene-butadiene, neoprene- and polybutadiene polymers. Depending on the composition to which the elastomer is added, the elastomer may be incorporated as a latex, in solution or in the melt, or as finely divided particles or fibrils. Generally, the elastomer is incorporated in the pavement rejuvenating or conditioning composition in the amount of up to about 13%, preferably about 0.5–10.0% elastomer, most preferably 1.5 to 5.0% elastomer.

DETAILED DESCRIPTION OF THE INVENTION

The present invention is a pavement rejuvenating and/or conditioning composition in which particular coal tar derivatives and other optional ingredients are supplemented with an elastomeric constituent. A rejuvenating or conditioning composition containing elastomer reliably holds in place a top layer of fine aggregate, whereas a rejuvenating or conditioning composition without elastomer does not. The elastomer is preferably acrylonitrile-butadiene polymer although other polymers can also be substituted including natural and nitrile-rubbers, polyorganosiloxane and, less preferably, styrene-butadiene, neoprene- and polybutadiene polymers. Depending on the composition to which the elastomer is added, the elastomer may be incorporated as a latex, in solution, or as finely divided particles or fibrils. Generally, the elastomer is incorporated in the pavement rejuvenating or conditioning composition in the amount of up to about 13%, preferably about 0.5–10.0% elastomer, most preferably 1.5 to 5.0% elastomer.

Pavement rejuvenating and conditioning compositions are disclosed in U.S. Pat. No. 3,221,615, No. 3,261,269 and No. 4,661,378 (now Reexamination Certificate 4,661,378) incorporated herein by reference. It is helpful in the context of this specification, however, to provide the following summary of these rejuvenating and conditioning compositions, so as to make the claimed invention more clear.

The bituminous pavement rejuvenator disclosed in U.S. Pat. No. 3,221,615 is a coal tar derivative containing a mixture of di-, tri- and tetracyclic aromatic compounds and their alkyl homologs containing lower alkyl groups together with a significant amount of phenolic and hydroxy derivatives, said mixture having a specific gravity at 25/25° C. of at least 1.08, a maximum Brookfield viscosity at 25° C. of 30 cps, and an initial boiling point of at least 180° C. and a continuous boiling range to at least 300° C., 70–40% by volume of the material remaining as residue at 300° C. (together with additional specifications). The rejuvenator is disclosed as at least primarily intended to rejuvenate bituminous pavement, namely, asphalt roads. The patent identifies the ability of the composition to plasticize the binder of the bituminous pavement as the assumed basis for its utility, and states that "[i]t has been found that the paving treated in accordance with this invention exhibits characteristics similar to those of a new pavement" and that "the pavement regains its ability to heal cracks under traffic and previously curled surfaces flatten under traffic," or in other words "regains its cold flow properties." The composition is handled in the same manner as previously existing liquid bituminous materials, and is heated and sprayed onto the pavement surface to be treated in the amount of about 0.05 to 0.5 gallons per square yard surface.

The above-described bituminous pavement rejuvenator is itself an ingredient in the pavement dressing conditioner described in U.S. Pat. No. 3,261,269. The pavement dressing conditioner can be applied to asphalt, concrete and other paved surfaces and contains "road tar" and coal tar solvent in addition to bituminous pavement rejuvenator. When used to treat paved surfaces, this admixture is believed to restore the resilience of pavement which has otherwise started to harden and to crack, so as to prevent further cracking and even to restore the ability for self-healing of cracks to the existing pavement.

The pavement dressing conditioner described in Reexamination Certificate No. 4,661,378 is very similar to the pavement dressing conditioner disclosed in the '269 patent, except that it also includes a specialized solvent.

Both pavement dressing conditioners and the bituminous pavement rejuvenator described above may be enhanced by the addition of elastomer according to the present invention. The addition may be accomplished in any of the following ways, which list is not exhaustive. Up to 13% by weight of the elastomer may be melt admixed (or otherwise "digested") into the bituminous pavement rejuvenator itself; up to 30% by weight elastomer may be dissolved or melt admixed in the solvent component of the pavement dressing conditioner; up to 25% by weight elastomer may be dissolved or melt combined with the "road tar" component of the pavement dressing conditioner; or emulsified elastomer may be added to the pavement dressing conditioner with or without added elastomer via its individual constituents. In certain instances fibrils or finely divided solid particles of elastomer may be incorporated into the bituminous pavement rejuvenator or pavement dressing conditioner, with or without dissolution or melt combining of the fibrils or particles in the process. In any event, the bituminous pavement rejuvenator may contain up to about 13% added elastomer by weight, and the pavement dressing conditioner may contain between about 0.5 to 10% by weight elastomer, preferably 1.5–5.0% elastomer.

Compositions prepared according to the above description have enhanced properties over the bituminous pavement rejuvenators and pavement dressing conditioners known in the art. They are able to withstand restored traffic more quickly, are able to withstand weathering such as heavy rain earlier after application, and give enhanced pavement crack-healing properties and wear resistance. They are able immediately to hold and to retain a top layer of fine aggregate. Fine aggregate can be considered to be any natural or manufactured sand with 100% passing a No. 4 sieve and not more than 10% passing a No. 200 sieve, and is preferably black in color. The presence of the elastomer also enhances the ability of the pavement to hold the fine aggregate after it is embedded by the natural action of normal traffic or other loads.

Although the invention has been described with particularity above, the following examples illustrate specific embodiments of the above-described invention.

EXAMPLE 1

Topped coke oven tar (75–100 seconds Float Test at 50° C., 47.4% by weight) at a temperature of 180° F. was added to a mixing tank equipped with a three-bladed impeller and 5% by weight particulate acrylonitrile-butadiene polymer was admixed therewith. The mixture was stirred at 60 r.p.m. for 3 to 6 hours and then 16.0% by weight of bituminous pavement rejuvenator (according to U.S. Pat. No. 3,221,615) at a temperature of 150° F. was added. The mixture was stirred for an additional 3 hours in order to mix the ingredients thoroughly. The pavement dressing conditioner was then transferred to a storage tank. At ambient temperature 25–30% by weight of an aromatic solvent (Hi Sol 10) was added and stirred an additional 60 minutes to mix the ingredients thoroughly.

EXAMPLE 2

Topped coke oven tar (75–100 seconds Float Test at 50° C., 45.4% by weight) at a temperature of 180° F. was added to a mixing tank equipped with a three-bladed impeller and 7% by weight natural rubber was admixed therewith. The mixture was stirred at 60 r.p.m. for 3–6 hours and then 16.0% by weight of bituminous pavement rejuvenator (according to U.S. Pat. No. 3,221,615) at a temperature of 150° F. was added. The mixture was stirred for an additional 3 hours in order to mix the ingredients thoroughly. The pavement dressing conditioner was then transferred to a storage tank. At ambient temperature 25–30 % by weight of an aromatic solvent (Hi Sol 10) was added and stirred an additional 60 minutes to mix the ingredients thoroughly.

EXAMPLE 3

Topped coke oven tar (75–100 seconds Float Test at 50° C., 52.4% by weight) at a temperature of 180° F. was added to a mixing tank equipped with a three-bladed impeller. The mixture was stirred at 60 r.p.m. for 3–6 hours and then 16.0% by weight of a melt combination of nine parts by weight of a bituminous pavement rejuvenator (according to U.S. Pat. No. 3,221,615) and one part by weight acrylonitrile-butadiene polymer were added at a temperature of 150° F. The mixture was stirred for an additional 3 hours in order to mix the ingredients thoroughly. The pavement dressing conditioner was then transferred to a storage tank. At ambient temperature 25–30% by weight of an aromatic solvent (Hi Sol 10) was added and stirred an additional 60 minutes to mix the ingredients thoroughly.

EXAMPLE 4

Topped coke oven tar (75–100 seconds Float Test at 50° C., 52.4% by weight) at a temperature of 180° F. was added to a mixing tank equipped with a three-bladed impeller and 5% by weight neoprene polymer was admixed therewith. The mixture was stirred at 60 r.p.m. for 3–6 hours and then 16.0% by weight of bituminous pavement rejuvenator (according to U.S. Pat. No. 3,221,615) at a temperature of 150° F. was added. The mixture was stirred for an additional 3 hours in order to mix the ingredients thoroughly. The pavement dressing conditioner was then transferred to a storage tank. At ambient temperature 25–30% by weight of an aromatic solvent (Hi Sol 10) was added and stirred an additional 60 minutes to mix the ingredients thoroughly.

EXAMPLE 5

The composition according to Example 1 was blended with about 30% by weight of an aromatic solvent sold under the tradename Hi-Sol 10 and having the following specifications: API Gravity @60° F. of from 11–30, Specific Gravity @60/60° F. of from 0.876–0.993, Distillation Range °F. of from 310–450 IBP (initial boiling point, ASTM:

D86–62), to 350–550 DP (dry point, ASTM: D86-62) an point ° F. TCC of from 110–250.

Although the above description and examples are illustrative of the present subject matter, the invention is only to be limited insofar as is set forth in the accompanying claims.

What is claimed is:

1. A pavement treating composition comprising a quantity of bituminous pavement rejuvenator consisting essentially of a coal tar derivative containing a mixture or di-, tri- and tetracyclic aromatic compounds and their alkyl homologs containing lower alkyl groups together with a significant amount of phenolic and hydroxy derivatives, said mixture having a specific gravity at 25°/25° C. of at least 1.08, a maximum Brookfield viscosity at 25° C. of 30 cps, and an initial boiling point of at least 180° C. and a continuous boiling range to at least 300° C., with 70–40% by volume of the material remaining as residue at 300° C., in admixture with a quantity of elastomer.

2. The composition according to claim 1 wherein said elastomer is acrylonitrile-butadiene polymer.

3. The composition according to claim 1 wherein said composition additionally includes a quantity of road tar and a quantity of solvent.

4. The composition according to claim 1 wherein said elastomer is present in the amount of about 0.01 to 13% by weight of said bituminous pavement rejuvenator.

5. The composition according to claim 3 wherein said elastomer is present in the amount of about 0.5 to 10.0% elastomer based on the weight of the composition.

6. The composition according to claim 3 wherein said elastomer is present in the amount of about 1.5 to 5.0% elastomer based on the weight of the composition.

7. The composition according to claim 1 wherein said elastomer is selected from the group consisting of nitrile polymers, butadiene polymers, and natural and synthetic rubber polymers.

8. The composition according to claim 7 wherein said elastomer is selected from the group consisting of acrylonitrile-butadiene polymer, neoprene polymers and styrene-butadiene resins.

9. The composition according to claim 3 further containing an aromatic solvent and wherein said elastomer is combined in the form of an aqueous latex.

10. The composition according to claim 9 wherein said elastomer is acrylonitrile-butadiene polymer which is present in the amount of about 1.5–5% by weight of the composition.

* * * * *

US005578663C1

(12) EX PARTE REEXAMINATION CERTIFICATE (9319th)

United States Patent
McGovern

(10) Number: US 5,578,663 C1
(45) Certificate Issued: Oct. 1, 2012

(54) PAVEMENT REJUVENATOR AND DRESSING CONDITIONER WITH ELASTOMER

(75) Inventor: Edward W. McGovern, Pittsburgh, PA (US)

(73) Assignee: K.A.E. Paving Consultants, Inc., Cranberry, PA (US)

Reexamination Request:
No. 90/009,777, Jul. 26, 2010

Reexamination Certificate for:
Patent No.: 5,578,663
Issued: Nov. 26, 1996
Appl. No.: 08/429,581
Filed: Apr. 27, 1995

(51) Int. Cl.
*C10C 3/00* (2006.01)
*C08L 7/00* (2006.01)
*C08L 15/00* (2006.01)
*C08L 83/10* (2006.01)
*C10C 3/02* (2006.01)

(52) U.S. Cl. ............... 524/66; 524/59; 524/60; 524/68; 524/71

(58) Field of Classification Search .................. None
See application file for complete search history.

(56) References Cited

To view the complete listing of prior art documents cited during the proceeding for Reexamination Control Number 90/009,777, please refer to the USPTO's public Patent Application Information Retrieval (PAIR) system under the Display References tab.

*Primary Examiner* — Jerry D. Johnson

(57) ABSTRACT

A pavement rejuvenating and/or conditioning composition in which particular coal tar derivatives and other optional ingredients are supplemented with an elastomeric constituent. A rejuvenating or conditioning composition containing an elastomer will reliably hold in place a top layer of fine aggregate, whereas a rejuvenating or conditioning composition without elastomer does not, and also allows for early restoration of traffic, prompt resistance to rain, and good repair and wear resistance of and in the pavement to be maintained. The elastomer is preferably acrylonitrile-butadiene polymer although other polymers can also be substituted including natural and nitrile-rubbers, polyorganosiloxane and, less preferably, styrene-butadiene, neoprene- and polybutadiene polymers.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *